May 17, 1932. E. YOST ET AL 1,858,421
FEEDER
Filed April 17, 1931  3 Sheets-Sheet 1
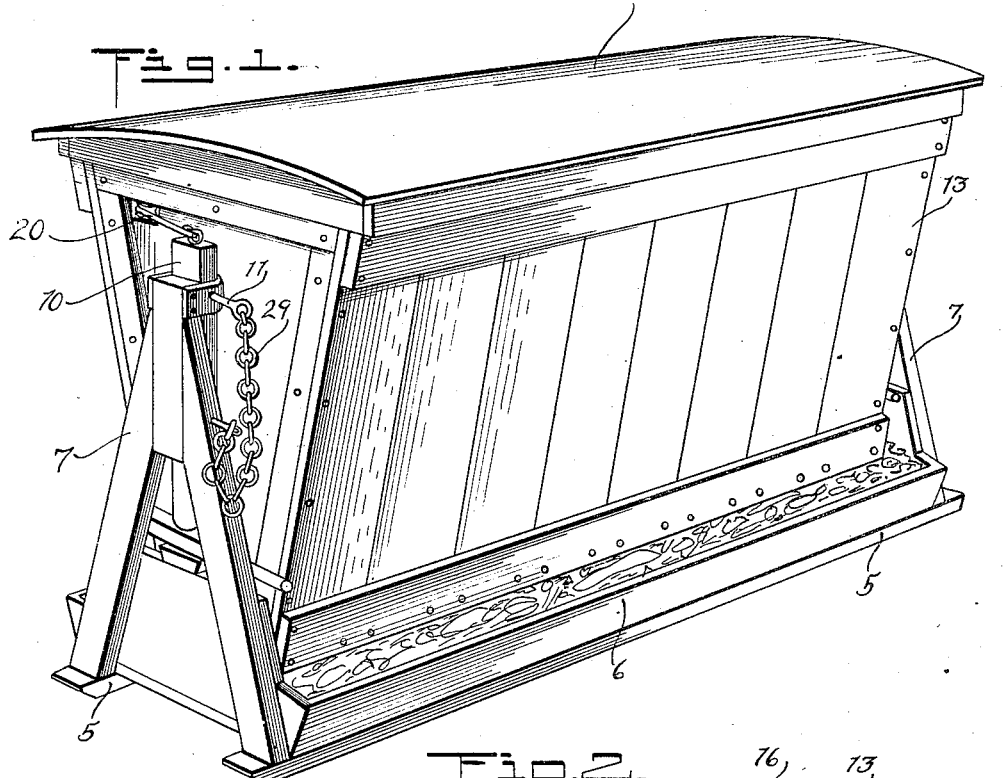
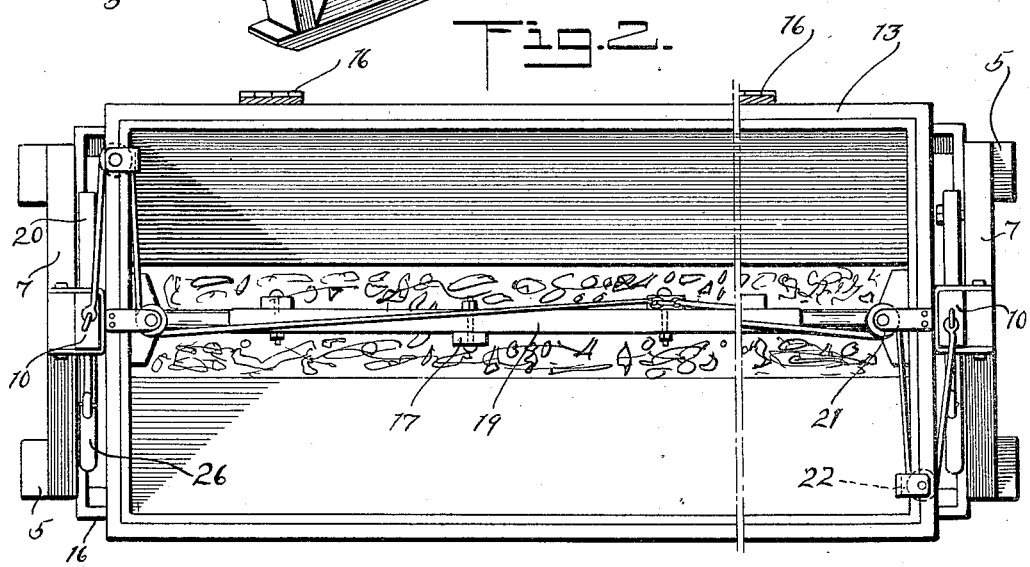
Inventor
EDD YOST
PHILIP STULL
By Clarence A. O'Brien
Attorney

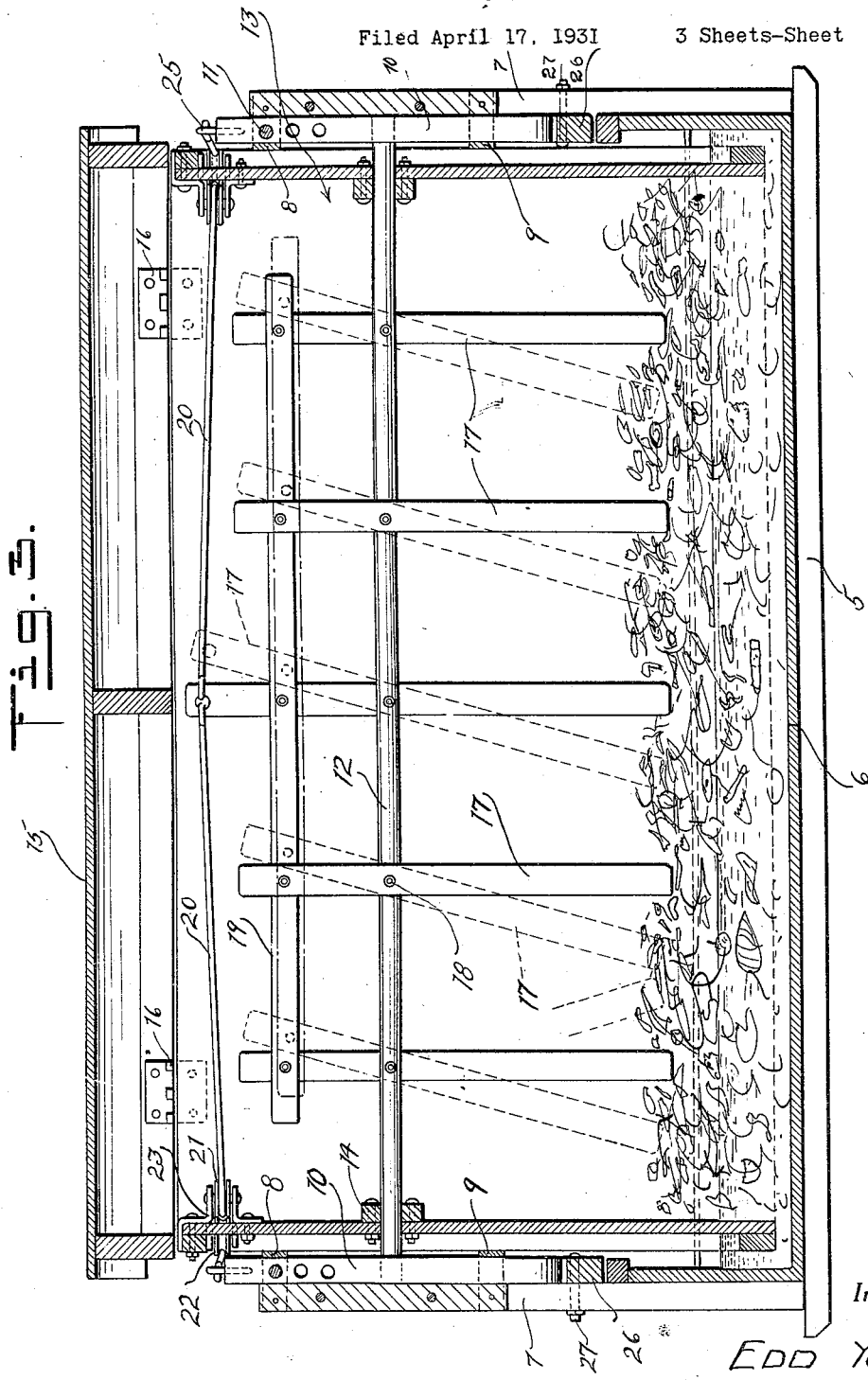

May 17, 1932.  E. YOST ET AL  1,858,421
FEEDER
Filed April 17, 1931   3 Sheets-Sheet 3
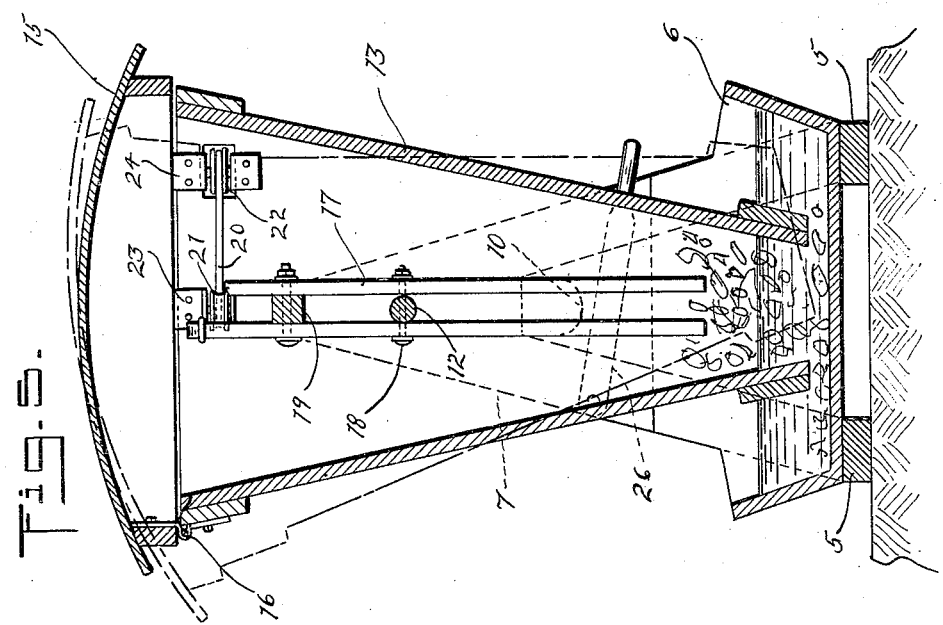
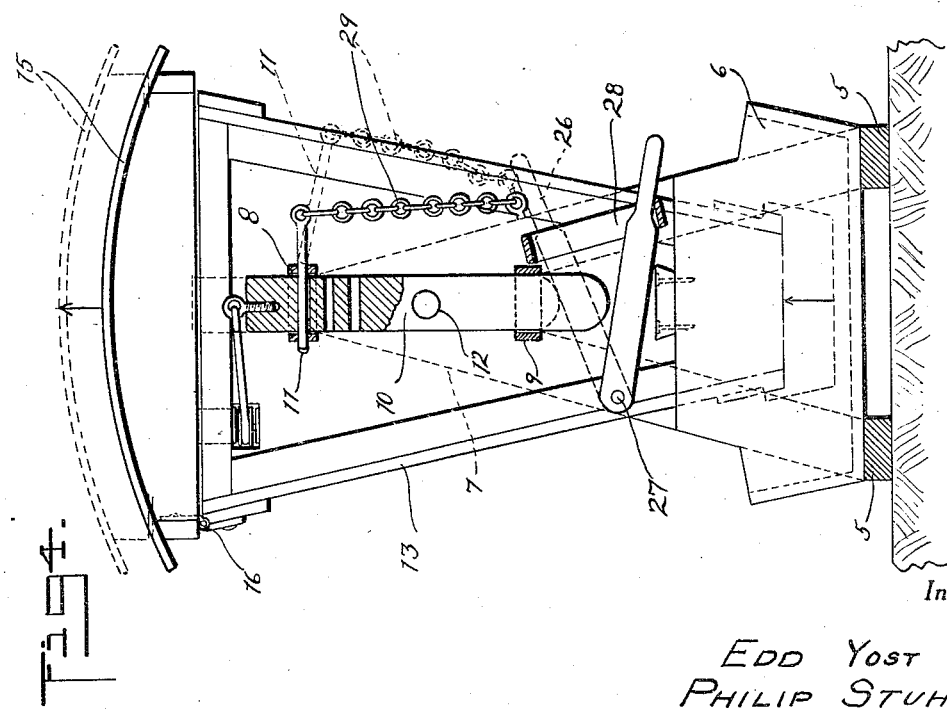
Inventor
EDD YOST
PHILIP STUHL
By Clarence A. O'Brien
Attorney Patented May 17, 1932

1,858,421

UNITED STATES PATENT OFFICE

EDD YOST AND PHILIP STULL, OF DANVILLE, OHIO

FEEDER

Application filed April 17, 1931. Serial No. 530,981.

This invention relates to hog feeders and in general to such types of feeders as are used for animals, the invention consisting primarily in the provision of such a feeder equipped with an agitator to prevent clogging of the feed in its passage from a hopper to the trough.

The invention further consists in the novel arrangement of a hopper and agitator arranged therein whereby movement of the trough as may be occasioned by the animal striking the trough, will be transmitted to the agitator for operating the latter.

A still further object of the invention is to provide a feeder of the character above referred to characterized by the provision of a trough, a hopper, means for mounting the hopper for vertical adjustment relative to the trough and additional means for mounting the hopper for swinging movement relative to the trough on an axis parallel to the trough.

Other objects and advantages of the invention will become apparent from a study of the following description, taken in connection with the accompanying drawings wherein:

Figure 1 is a perspective view of the feeder.

Figure 2 is a top plan view thereof, the lid of the hopper being removed.

Figure 3 is a vertical longitudinal sectional view therethrough.

Figure 4 is a sectional elevational view at one end of the feeder, the raised position of the hopper being suggested by dotted lines.

Figure 5 is a vertical transverse sectional view of the feeder, and illustrating two different positions of the hopper relative to the trough.

Referring more in detail to the drawings a pair of parallel runners 5 support therebetween a trough 6 disposed between standards 7 rising from the ends of the runners 5.

Each of the standards 7 is provided with a pair of vertically spaced alined guide straps 8 and 9 slidably accommodating a vertical supporting bar 10.

Bar 10 is provided with a vertical series of openings 6 extending therethrough for selective registry with alined openings provided in the uppermost guide strap 8 whereby the bar 10 may be fixed at the desired vertical adjustment relative to the post 7 when a pin 11 is passed through the openings in the guide strap and a selected one of the openings in the bar 10.

Bars 10 are connected by a horizontal pivot rod 12 that rockably supports thereon a hopper designated generally by the reference character 13. Hopper 13 may be of any desired construction but as herein shown, is opened at its top and bottom, and has inclined side walls converging toward their lower edges to provide a restricted discharge opening at the bottom of the hopper to facilitate the passage of the feed through the hopper into the trough 6. Rod 12 extends longitudinally through the hopper, and the end walls of the hopper are provided with suitable journals 14 for accommodating the ends of the rod 12.

Obviously by adjusting the bars 10 relative to the standards 7, hopper 13 will be secured in vertical adjustment relative to the trough 6 and may be swung about the bar 12 as a pivot relative to the trough 6 upon contact of the feeding animals with either side of the hopper.

A suitable lid 15 is provided for the top of the hopper, and the lid is hingedly mounted as at 16.

In order to prevent clogging of the feed in its passage from the hopper to the trough there is provided in the hopper a suitable agitating device.

The agitator above referred to comprises a plurality of relatively spaced agitating fingers 17 disposed on opposite sides of pivot rod 12 and pivotally connected thereto as at 18. Fingers 17 are connected together by a connecting bar 19, the fingers 17 being pivotally connected with the bar 19 adjacent the upper ends of the fingers. An intermediate one of said fingers 17 at its upper end terminates above the corresponding ends of the remaining fingers 17 and oppositely acting cables 20 are connected at one end to the upper end of said intermediate one of the fingers 17 and are each trained over a pair of relatively spaced pulleys 21, 22 journalled in brackets 23, 24 suitably mounted on an end wall of the hopper 13.

The free ends of the cables 20 extend through openings provided in the end walls of the hopper 13 opposite to the brackets 24, and are anchored as at 25 to the upper portions of the bars 10.

From what has been said hereinbefore, it is apparent that upon rocking of the hopper 13 about its axis 12, by reason of the oppositely acting cables 20, one of which exerts a pull upon the intermediate one of said fingers 17 when rocked about its pivot 18 in one direction, while the other cable exerts an opposite pull thereon upon rocking movement of the hopper in an opposite direction, the back and forth movement of said one finger is transmitted to the remaining fingers 17 through the bar 19, thus agitating the material and preventing the same from clogging as it feeds by gravity from the hopper into the trough 6.

Raising and lowering the hopper 13 relative to the trough 6, is expedited through the medium of levers 26 pivoted at one end as at 27 on the standards 7 and having their free ends operable in obliquely disposed guides 28 also provided on the standards 7. Intermediate portions of the levers 26 engage the lower ends of the bars 10 and hence, subsequent to the releasing of pins 11, bars 10 may be raised or lowered as desirable by swinging the levers 26 about their pivots 27 in the manner thought apparent.

To prevent loss of the pins 11, the same are suitable secured on the ends of flexible elements 29 anchored to the standards 7.

Even though we have herein shown and described the preferred embodiment of the invention, it is to be understood that we do not wish to limit ourselves beyond the requirements of the prior art, and the scope of the appended claims.

Having thus described our invention, what we claim as new is:

1. In a device of the character described, a trough, a hopper pivotally mounted in operative position to the trough for feeding material to the trough, an agitator arranged in the hopper, and means for transmitting the movement of the hopper to said agitator.

2. In a device of the character described, a pair of opposed vertically adjustable supports, a hopper, a pivot rod for the hopper extending therethrough and connecting said supports, agitator fingers mounted on said pivot rod, and means for transmitting the movement of the hopper to said fingers.

3. A feeder comprising a trough, a hopper open at its bottom, means for pivotally supporting said hopper above said trough, a plurality of pivotally mounted agitator fingers arranged in said hopper, and oppositely acting means for swinging said fingers about their pivots during swinging movement of said hopper.

4. In a device of the character described, a pair of opposed vertically shiftable members, means for securing said members at the desired adjustment, a hopper disposed between said members, a pivot rod extending through said hopper and connecting said members, said hopper being rotatable relative to said rod, agitator fingers mounted on said rod and rockable relative thereto on an axis at right angles to said rod, and means for transmitting movement of said hopper to said fingers.

5. A feeding device comprising in combination a trough, a hopper mounted in operative position to said trough and capable of shiftable movement relative to the trough, agitating means mounted in said hopper, and means for transmitting the movement of said hopper to said agitating means.

6. A feeding device comprising in combination a trough, a hopper mounted in operative position to said trough and capable of shiftable movement relative to the trough, agitating means mounted in said hopper, and means for transmitting the movement of said hopper to said agitating means, said agitating means comprising a plurality of relatively spaced pivotally mounted agitating fingers, a bar connecting said fingers, and oppositely acting means connected with one of said fingers and operable to rock said fingers upon shifting movement of said hopper.

In testimony whereof we affix our signatures.

EDD YOST.
PHILIP STULL.